(12) United States Patent
Lehmann

(10) Patent No.: US 7,942,938 B2
(45) Date of Patent: May 17, 2011

(54) GAS-RESISTANT PHTALOCYANINE DYES

(75) Inventor: Urs Lehmann, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/922,661

(22) PCT Filed: Jun. 28, 2006

(86) PCT No.: PCT/EP2006/063630
§ 371 (c)(1),
(2), (4) Date: Dec. 20, 2007

(87) PCT Pub. No.: WO2007/006652
PCT Pub. Date: Jan. 18, 2007

(65) Prior Publication Data
US 2009/0083912 A1    Apr. 2, 2009

(30) Foreign Application Priority Data
Jul. 8, 2005 (EP) .................................... 05106248

(51) Int. Cl.
*D06P 1/00* (2006.01)
*C09B 47/04* (2006.01)
*C09D 11/00* (2006.01)
*B05D 5/00* (2006.01)
*B41F 33/00* (2006.01)

(52) U.S. Cl. .......... 8/661; 8/636; 106/31.27; 106/31.46; 427/288; 101/483

(58) Field of Classification Search ............. 8/661, 636; 106/31.27, 31.46; 427/288; 101/483
See application file for complete search history.

(56) References Cited

U.S. PATENT DOCUMENTS

| | | | |
|---|---|---|---|
| 4,213,757 A * | 7/1980 | Ruske et al. ....................... 8/518 |
| 7,311,391 B2 * | 12/2007 | Ogawa et al. .................. 347/100 |
| 2003/0138728 A1 | 7/2003 | Saito ........................ 430/270.15 |
| 2003/0193553 A1 * | 10/2003 | Issler ............................ 347/100 |
| 2004/0045478 A1 | 3/2004 | Tateishi et al. |
| 2005/0081745 A1 | 4/2005 | Ogawa et al. .............. 106/31.27 |

FOREIGN PATENT DOCUMENTS

| | | |
|---|---|---|
| EP | 1 271 500 | 1/2003 |
| GB | 2343187 | 5/2000 |
| JP | 2116592 | 5/1990 |
| JP | 2003/012956 | 1/2003 |
| JP | 2003/176429 | 6/2003 |
| JP | 2003/213168 | 7/2003 |
| JP | 2004/142158 | 5/2004 |
| WO | 02/060994 | 8/2002 |
| WO | 03/066751 | 8/2003 |

OTHER PUBLICATIONS

English language abstract of JP 2004/142158 printed on Feb. 7, 2008 from the esp@cenet web site.

English language abstract of JP 2116592 printed on Feb. 7, 2008 from the esp@cenet web site.

(Continued)

*Primary Examiner* — Lorna M Douyon
*Assistant Examiner* — Tanisha Diggs
(74) *Attorney, Agent, or Firm* — Shiela A. Loggins; Qi Zhuo

(57) ABSTRACT

The present invention relates to dyes of formula (1), wherein Pc is a phthalocyanine of formula (2), Me is a metal, [MePc] is a phthalocyanine-metal complex of formula (3), $M^+$ is an inorganic or organic cation, $R_1$ is hydrogen, unsubstituted or substituted alkyl, unsubstituted or substituted aralkyl or unsubstituted or substituted aryl, and $R_2$ is hydrogen, unsubstituted or substituted alkyl, unsubstituted or substituted aralkyl or unsubstituted or substituted aryl, and n and m are each independently of the other 0, 1, 2, 3, 4, 5, 6, 7 or 8, the sum of (n+m) being a number 5, 6, 7 or 8, and also to mixtures thereof, to processes for the preparation thereof and to the use thereof in dyeing or printing natural, semi-synthetic or synthetic material.

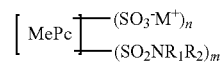

(1)

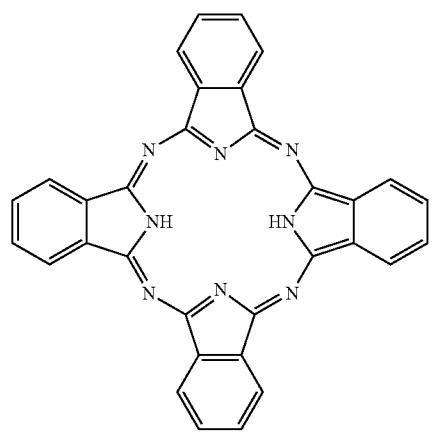

(2)

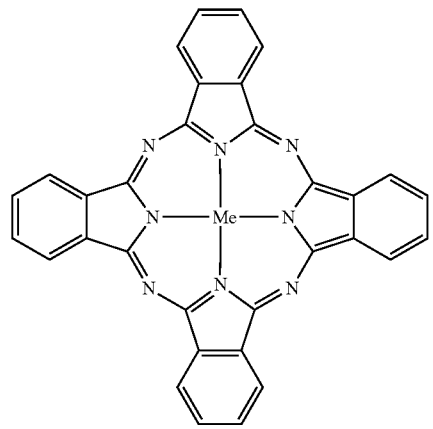

(3)

17 Claims, No Drawings

OTHER PUBLICATIONS

English language abstract of JP 2003/012956 printed on Feb. 7, 2008 from the esp@cenet web site.
English language abstract of JP 2003/213168 printed on Feb. 7, 2008 from the esp@cenet web site.
English language abstract of JP 2003/176429 printed on Feb. 7, 2008 from the esp@cenet web site.
Arzhantsev et al. "Raman Microspectra of Phthalocyanines in living cells" Izvestiya Akademii Nauk, Ser. Fizich, vol. 60, No. 3, 1996 pp. 136-141.
L.I. Solav' Eva et al., "Phthalocyanine and related compounds" Zhurnal Obshechei Khimii, vol. 52 No. 1, 1982, pp. 90-101.
N.B. McKeown, "Phthalocyanines and related compounds" Science of Synthesis vol. 17, 2004 pp. 1237-1368.

* cited by examiner

GAS-RESISTANT PHTALOCYANINE DYES

This Application is the U.S. National Phase of PCT/EP2006/063630, filed on Jun. 28, 2006, which claims priority from European Patent Application No. 05106248.7, filed Jul. 8, 2005.

The present invention relates to novel phthalocyanine-metal complex dyes and to the preparation thereof, and also to a method of dyeing or printing natural, semi-synthetic or synthetic material using those phthalocyanine-metal complex dyes.

The use of phthalocyanine-based dyes in dyeing and printing methods has been known for a long time.

However, it has been found that the known phthalocyanine dyes used in those methods do not always entirely satisfy the highest requirements, especially in respect of fastness to light. Besides fastness to light, resistance to gases, e.g. especially ozone but also nitrogen oxides, (so-called "gas fading") is, above all, a problem that has not been satisfactorily solved hitherto, especially in the case of ink-jet printing, above all in the case of printing on microporous materials such as, for example, quick-drying photo paper.

There is accordingly a need for new phthalocyanine-based dyes which result in light-fast and gas-resistant dyeings and which exhibit good all-round fastness properties.

It has now been found, surprisingly, that the phthalocyanine-metal complex dyes according to the invention largely meet the above-mentioned criteria.

The present invention accordingly relates to dyes of formula

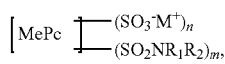

(1)

wherein
Pc is a phthalocyanine of formula

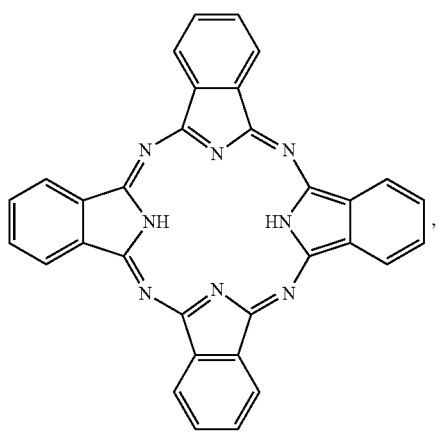

Me is a metal,
[MePc] is a phthalocyanine-metal complex of formula

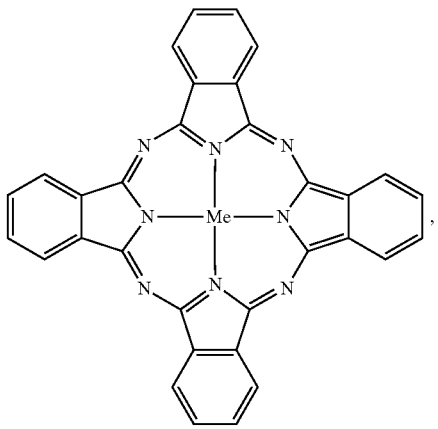

$M^+$ is an inorganic or organic cation,
$R_1$ is hydrogen, unsubstituted or substituted alkyl, unsubstituted or substituted aralkyl or unsubstituted or substituted aryl, and
$R_2$ is hydrogen, unsubstituted or substituted alkyl, unsubstituted or substituted aralkyl or unsubstituted or substituted aryl, and
n and m are each independently of the other 0, 1, 2, 3, 4, 5, 6, 7 or 8,
the sum of (n+m) being a number 5, 6, 7 or 8,
and to mixtures of those dyes.

A metal Me is, for example, Ni, Fe, Co, V=O, Al, Mn or, especially, Cu.

An inorganic cation $M^+$ is, for example, $H^+$, a monovalent or divalent metal cation, especially an alkali metal or alkaline earth metal cation such as $Na^+$, $K^+$, $Li^+$, $Ca^{2+}$ or $Mg^{2+}$, or $NH_4^+$ or phosphonium.

An organic cation $M^+$ is, for example, 18-crown-6/$Na^+$ (a compound of formula or $N^+$ ($R_3$, $R_4$, $R_5$, $R_6$) wherein $R_3$ to $R_6$ are each independently of the others hydrogen, $C_1$-$C_{16}$alkyl, $C_7$-$C_{18}$aralkyl, $C_6$-$C_{18}$aryl or $C_1$-$C_4$alcohol, or a cation derived from Primene81R®, a commercial product of Rohm & Haas which is a primary amine mixture having a highly branched $C_{12}$-$C_{14}$alkyl side chain, or from $C_1$-$C_{14}$tetraalkylammonium hydroxide, especially from tetrabutylammonium hydroxide.

The organic cation $M^+$ is preferably the ammonium cation of an amine of formula

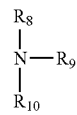

wherein $R_7$, $R_8$, $R_9$ and $R_{10}$ are each independently of the others hydrogen or unsubstituted or hydroxy- or amino-substituted, linear or branched $C_1$-$C_{14}$alkyl which is uninterrupted or which may be, from $C_3$ upwards, interrupted by an oxygen atom.

Suitable organic cations $M^+$ also include those that are derived from the following amines: $NH_2(CH_2)_2SO_3H$, $NH(CH_3)(CH_2)_2SO_3H$, $NH_2(CH_2)_2OH$, $NH_2(CH_2)_3OH$, $NH_2(CH_2)_2OSO_3H$, $NH(CH_2CH_2OH)_2$, $NH(CH_2CH_2OSO_3H)_2$, $NH_2(CH_2)_2O(CH_2)_2OH$, $NH_2(CH_2)_5OH$, $NH_2CH_2CH(CH_3)OH$, $NH_2(CH_2)_2NH(CH_2)_2OH$, $NH_2(CH_2)_2N(CH_2CH_3)_2$, $NH_2(CH_2)_3N(CH_2CH_3)_2$, $NH_2(CH_2)_2NH(CH_2)_3NH_2$, $NH_2(CH_2)_2NH(CH_2)_2NH_2$, $NH_2(CH_2)_3NH(CH_2)_3NH_2$, $NH_2CH_2C(CH_3)_2CH_2NH_2$, $NH_2(CH_2)_3NHCH_2CH_3$, $NH_2(CH_2)_3N(CH_3)_2$, $NH_2(CH_2)_3N(CH_2CH_3)_2$, $NH_2(CH_2)_3NH(CH_2)_3N(CH_3)_2$, $NH_2(CH_2)_3NH(CH_2)_3OH$, $NH_2CH_2CH(OH)CH_2NH_2$,

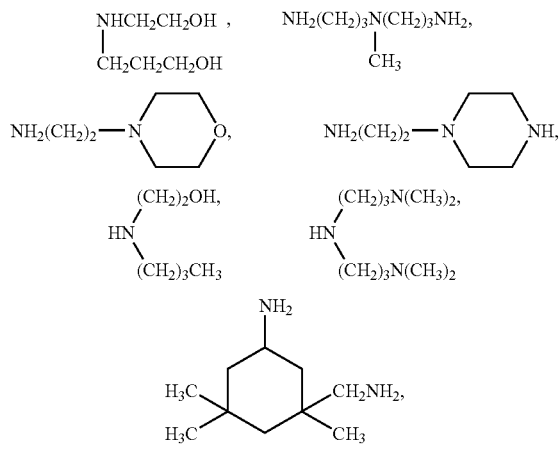

$NH_2OH$, $NH_2(CH_2)_2COOH$, $NH_2CH_2COOH$, morpholine, aniline-4-sulfonic acid, aniline-3-sulfonic acid, aniline-2-sulfonic acid, $NH_2(CH_2)_2S(CH_2)_2OH$, $NH_2(C_6H_4)SO_2CH_2CH_2OSO_3H$, piperazine,

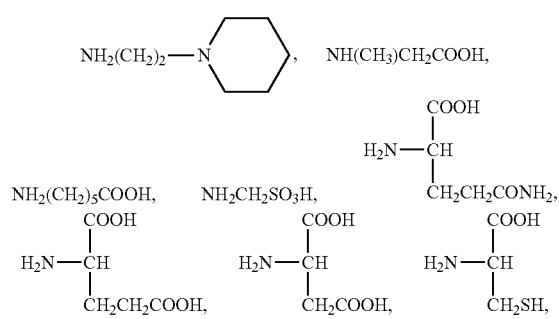

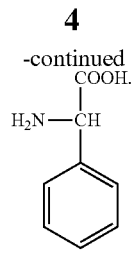

In $(SO_3^-M^+)_n$ the cations $M^+$ may also be different from one another from n=2 upwards.

Alkyl as $R_1$ may be straight-chained or branched and may be interrupted by oxygen radicals, nitrogen radicals and/or by sulfur radicals from $C_3$ upwards.

$R_1$ is preferably $C_1$-$C_{12}$alkyl such as, for example, methyl, ethyl, propyl, isopropyl, n-butyl, isobutyl, sec-butyl, tert-butyl, pentyl, hexyl, heptyl, octyl, nonyl, decyl, undecyl or dodecyl.

$C_3$-$C_{12}$Alkyl interrupted by an oxygen radical O, nitrogen radical N or sulfur radical S is, for example, $C_4$alkyl such as —$CH_2$—$CH_2$—$CH_2$—$CH_3$, —$CH_2$—$CH_2$—NH—$CH_2$—$CH_3$ or —$CH_2$—$CH_2$—S—$CH_2$—$CH_3$.

$C_1$-$C_{12}$Alkyl as $R_1$ may be unsubstituted or substituted by —OH, —$NR_{11}R_{12}$, —$OSO_3H$ or by —$SO_3H$, wherein $R_{11}$ and $R_{12}$ are each independently of the other hydrogen or $C_1$-$C_4$alkyl.

$R_1$ as aralkyl and aryl is, for example, $C_7$-$C_{25}$aralkyl, preferably $C_7$-$C_{12}$aralkyl, or $C_6$-$C_{24}$aryl, preferably $C_6$-$C_{12}$aryl.

$C_7$-$C_{25}$ Aralkyl is, for example, benzyl, 2-benzyl-2-propyl, β-phenyl-ethyl, α,α-dimethylbenzyl, ω-phenyl-butyl, ω,ω-dimethyl-ω-phenyl-butyl, ω-phenyl-dodecyl, ω-phenyl-octadecyl, ω-phenyl-icosyl or ω-phenyl-docosyl.

$C_7$-$C_{12}$Aralkyl is, for example, benzyl, 2-benzyl-2-propyl, β-phenyl-ethyl, 9-fluorenyl, α,α-dimethylbenzyl, ω-phenyl-butyl, ω-phenyl-dodecyl or ω,ω-dimethyl-ω-phenyl-butyl.

$C_6$-$C_{24}$ Aryl is, for example, phenyl, 1-naphthyl, 2-naphthyl, 4-biphenylyl, phenanthryl, 2- or 9-fluorenyl, anthraquinonyl or anthryl.

$C_6$-$C_{12}$Aryl is, for example, phenyl, 1-naphthyl, 2-naphthyl, 4-biphenylyl or 2-fluorenyl.

Alkyl as $R_2$ may be straight-chained or branched and may be interrupted by oxygen radicals, nitrogen radicals and/or by sulfur radicals.

$R_2$ is preferably $C_1$-$C_{12}$alkyl such as, for example, methyl, ethyl, propyl, isopropyl, n-butyl, isobutyl, sec-butyl, tert-butyl, pentyl, hexyl, heptyl, octyl, nonyl, decyl, undecyl or dodecyl.

$C_3$-$C_{12}$Alkyl interrupted by an oxygen radical O, nitrogen radical N or sulfur radical S is, for example, $C_4$ alkyl such as —$CH_2$—$CH_2$—$CH_2$—$CH_3$, —$CH_2$—$CH_2$—NH—$CH_2$—$CH_3$ or —$CH_2$—$CH_2$—S—$CH_2$—$CH_3$.

$C_1$-$C_{12}$Alkyl as $R_2$ may be unsubstituted or substituted by —OH, —$NR_{11}R_{12}$, —$OSO_3H$ or by —$SO_3H$, wherein $R_{11}$ and $R_{12}$ are each independently of the other hydrogen or $C_1$-$C_4$alkyl.

$R_2$ as aralkyl and aryl is, for example, $C_7$-$C_{25}$aralkyl, preferably $C_7$-$C_{12}$aralkyl, or $C_6$-$C_{24}$aryl, preferably $C_6$-$C_{12}$aryl.

$C_7$-$C_{25}$ Aralkyl is, for example, benzyl, 2-benzyl-2-propyl, β-phenyl-ethyl, α,α-dimethylbenzyl, ω-phenyl-butyl, ω,ω-dimethyl-ω-phenyl-butyl, ω-phenyl-dodecyl, ω-phenyl-octadecyl, ω-phenyl-icosyl or ω-phenyl-docosyl.

$C_7$-$C_{12}$ Aralkyl is, for example, benzyl, 2-benzyl-2-propyl, β-phenyl-ethyl, 9-fluorenyl, α,α-dimethylbenzyl, ω-phenyl-butyl, ω-phenyl-dodecyl or ω,ω-dimethyl-ω-phenyl-butyl.

$C_6$-$C_{24}$ Aryl is, for example, phenyl, 1-naphthyl, 2-naphthyl, 4-biphenylyl, phenanthryl, 2- or 9-fluorenyl, anthraquinonyl or anthryl.

$C_6$-$C_{12}$Aryl is, for example, phenyl, 1-naphthyl, 2-naphthyl, 4-biphenylyl or 2-fluorenyl.

The radical $NR_1R_2$ is derived, for example, from the following amines: $NH_2(CH_2)_2SO_3H$, $NH(CH_3)(CH_2)_2SO_3H$, $NH_2(CH_2)_2OH$, $NH_2(CH_2)_3OH$, $NH_2(CH_2)_2OSO_3H$, $NH(CH_2CH_2OH)_2$, $NH(CH_2CH_2OSO_3H)_2$, $NH_2(CH_2)_2O(CH_2)_2OH$, $NH_2(CH_2)_5OH$, $NH_2CH_2CH(CH_3)OH$, $NH_2(CH_2)_2NH(CH_2)_2OH$, $NH_2(CH_2)_2N(CH_2CH_3)_2$, $NH_2(CH_2)_3N(CH_2CH_3)_2$, $NH_2(CH_2)_2NH(CH_2)_3NH_2$, $NH_2(CH_2)_2NH(CH_2)_2NH_2$, $NH_2(CH_2)_3NH(CH_2)_3NH_2$, $NH_2CH_2C(CH_3)_2CH_2NH_2$, $NH_2(CH_2)_3NHCH_2CH_3$, $NH_2(CH_2)_3N(CH_3)_2$, $NH_2(CH_2)_3N(CH_2CH_3)_2$, $NH_2(CH_2)_3NH(CH_2)_3N(CH_3)_2$, $NH_2(CH_2)_3NH(CH_2)_3OH$, $NH_2CH_2CH(OH)CH_2NH_2$, $NHCH_2CH_2OH$

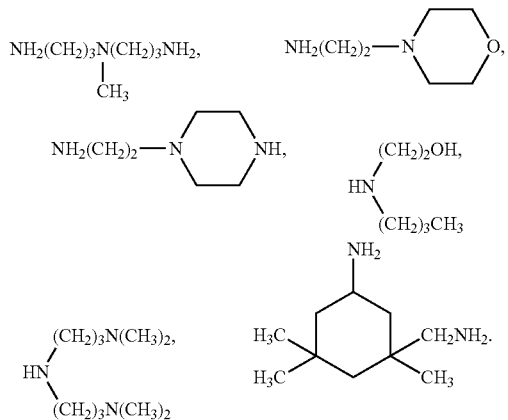

$CH_2CH_2CH_2OH$

The sum of (n+m) is preferably 6 or 7, especially 7.

$(SO_3^-M^+)_n$ denotes n identical or different radicals $SO_3^-M^+$.

$(SO_2NR_1R_2)_m$ denotes m identical or different radicals $SO_2NR_1R_2$.

The present invention relates also to a process for the preparation of the dyes of formula (1) according to the invention.

The dyes of formula (1) may be obtained in analogy to known methods, for example by sulfonating a compound of formula

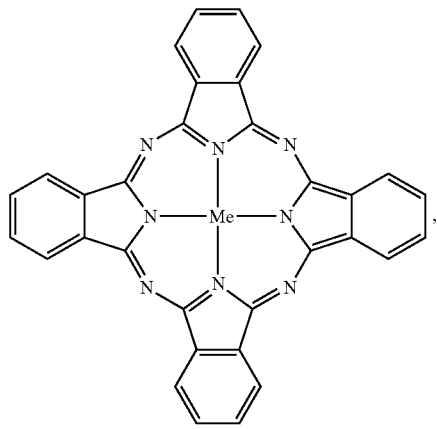

wherein Me is a metal, using a strong sulfonating agent, for example chlorosulfonic acid or oleum/sulfuric acid monohydrate, and then optionally neutralising the resulting sulfonic acid using a compound containing the inorganic or organic cation $M^+$. The sulfonic acid, or its salt, optionally is then converted, using suitable reagents, for example thionyl chloride or phosphorus oxychloride, into the corresponding sulfochloride, which is then reacted with, for example, ammonia or the amines mentioned hereinbefore.

Dyes of formula (1) wherein m=0 and n=7, m=1 and n=6, m=2 and n=5, m=3 and n=4, m=4 and n=3, m=5 and n=2, m=6 and n=1, and m=7 and n=0, and mixtures thereof, are important.

Examples of dyes of formula (1) are phthalocyanine-metal complex dyes of formulae (100)

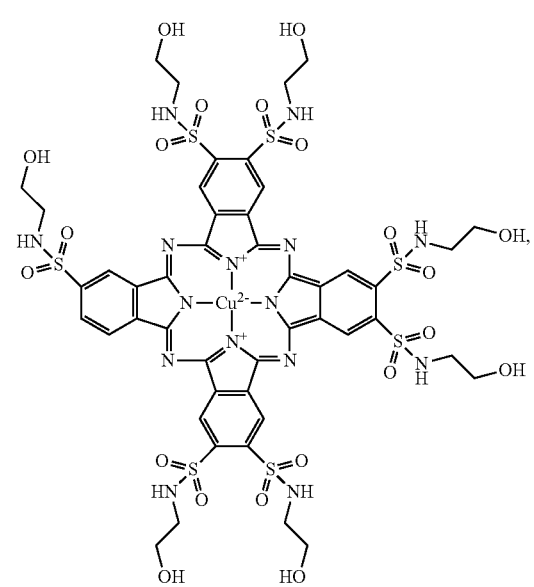

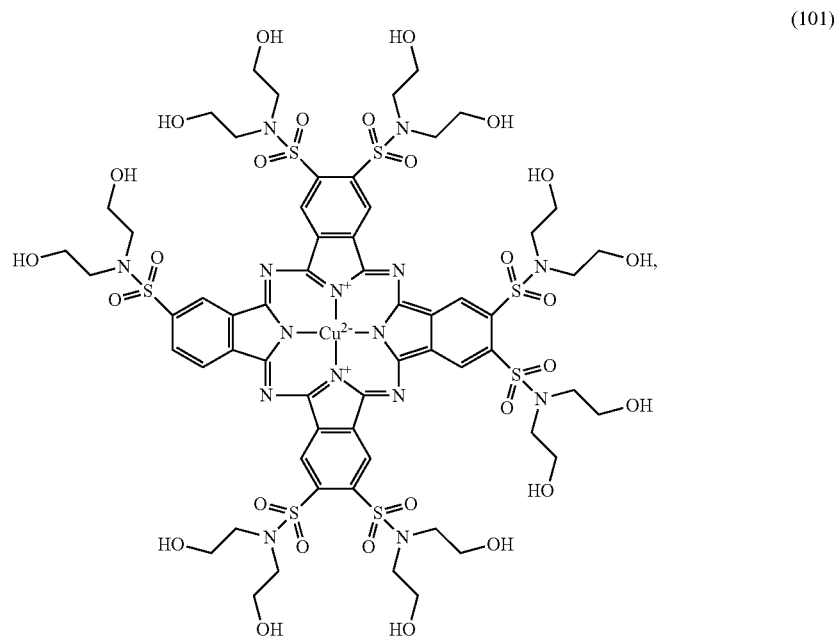
(101)
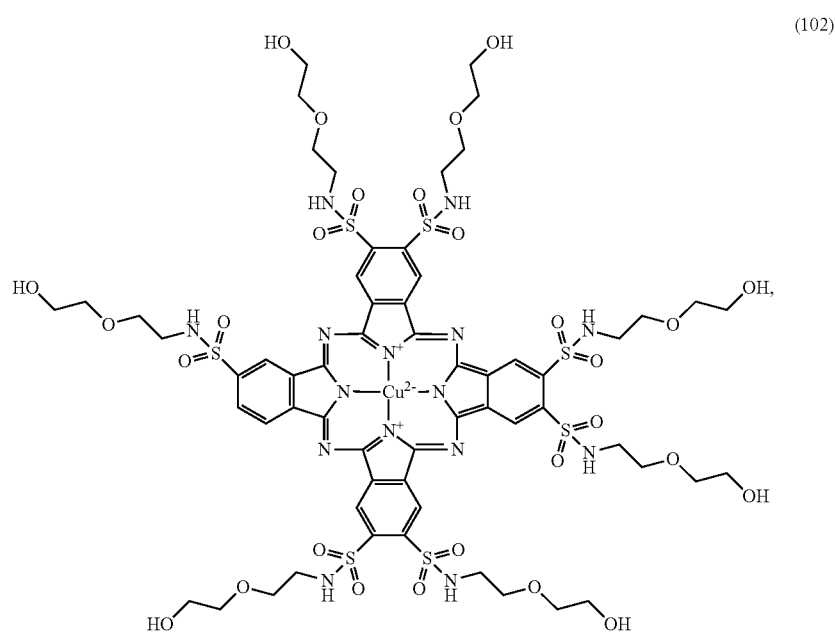
(102)

(103)
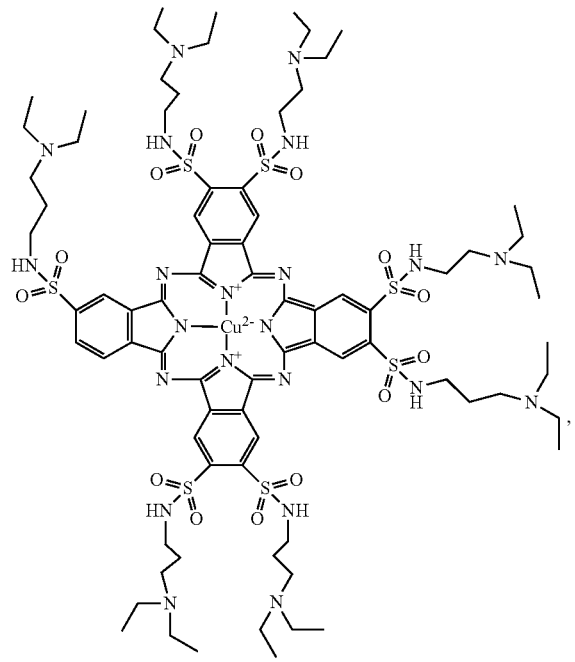
(104)
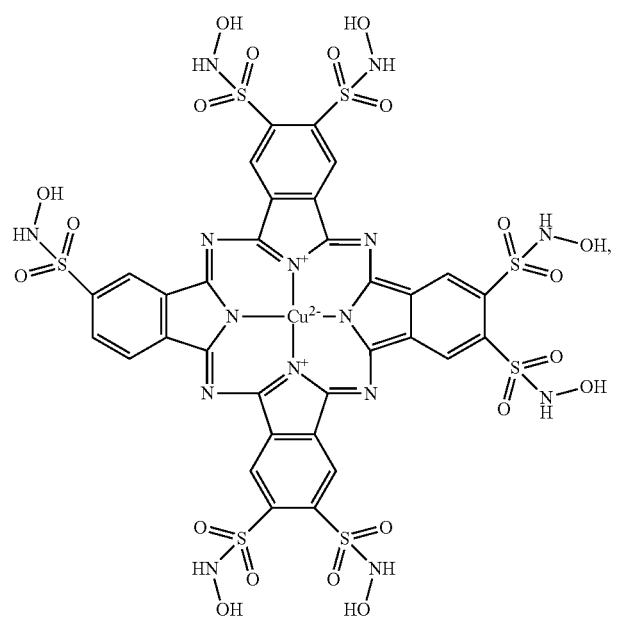

-continued
(105)
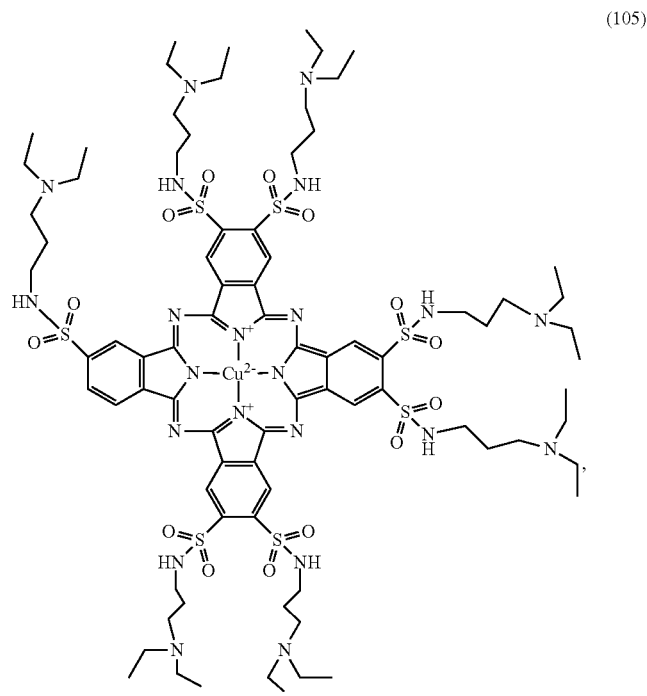
(106)
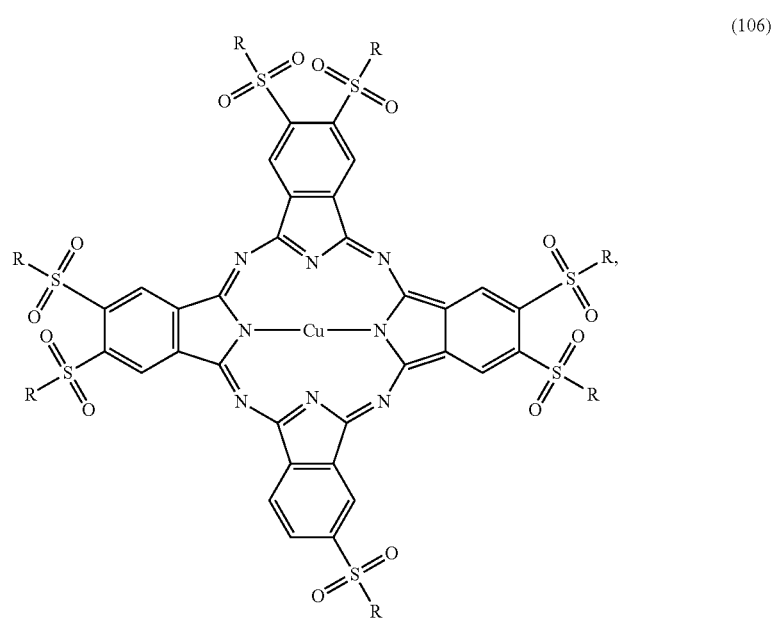
R = OH, NH₂

(107)
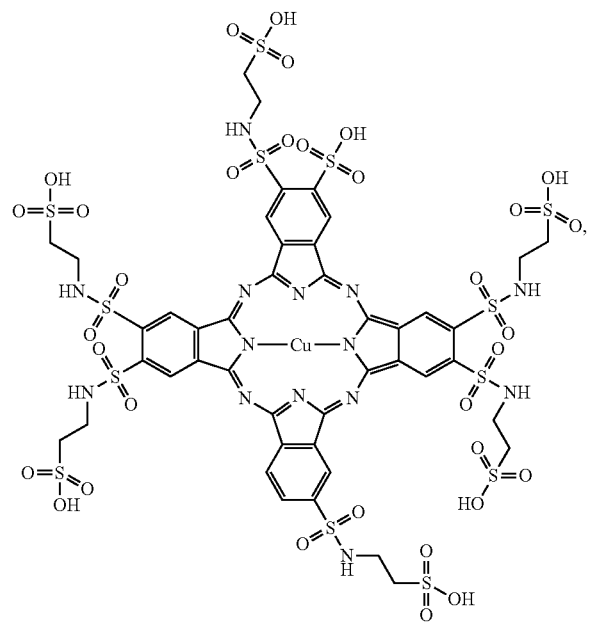
(108)
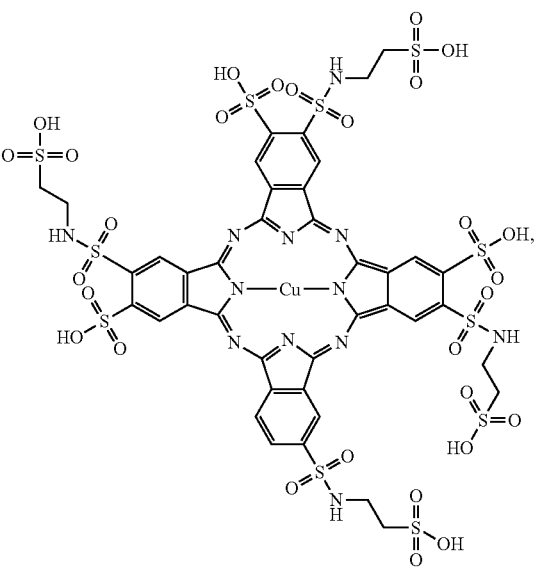
(109)
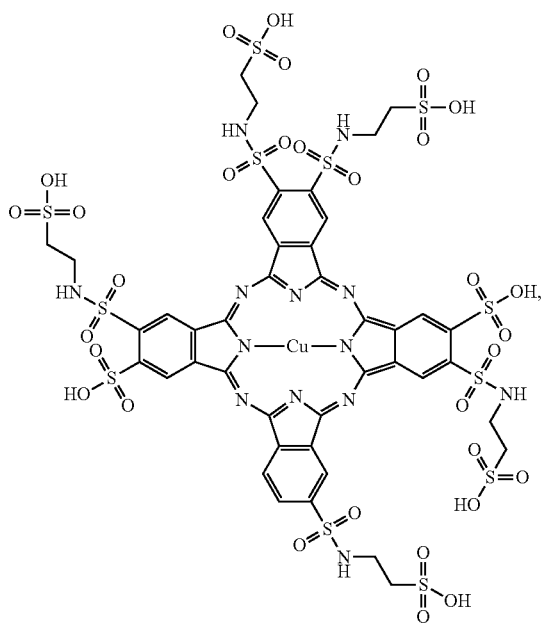

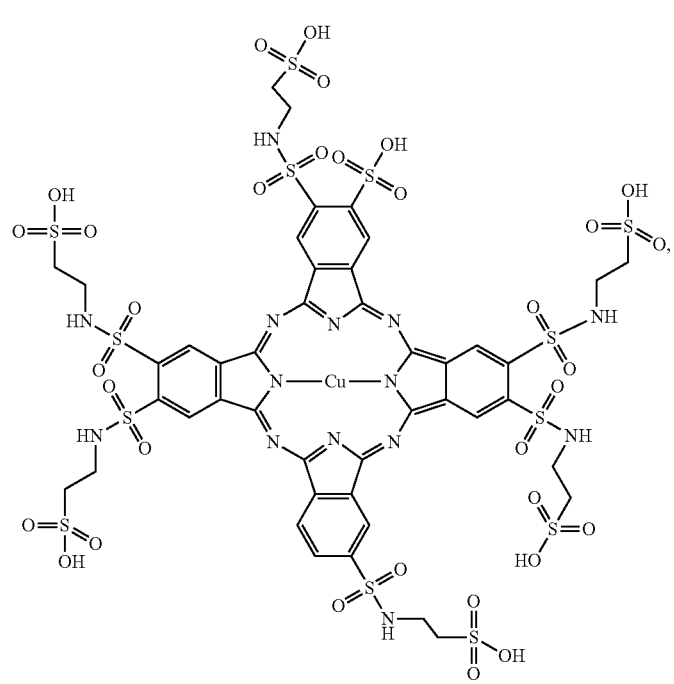
(110)
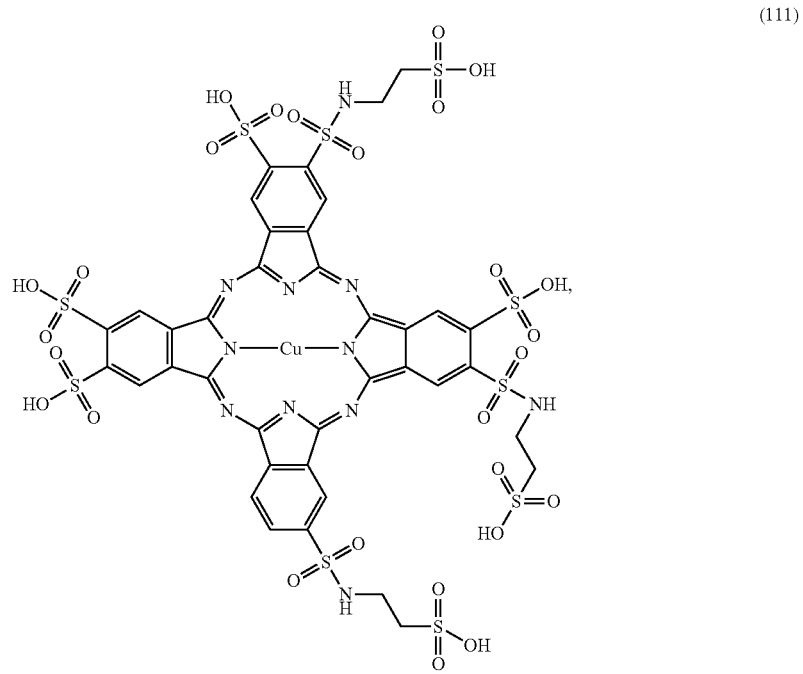
(111)

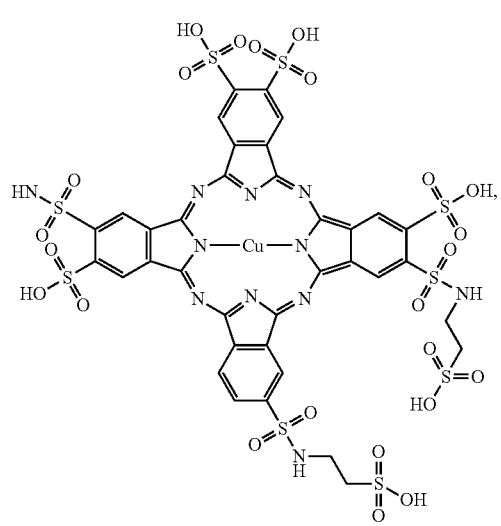 (112)

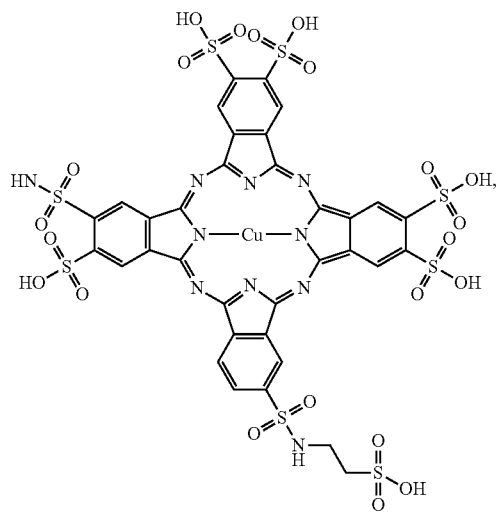 (113)

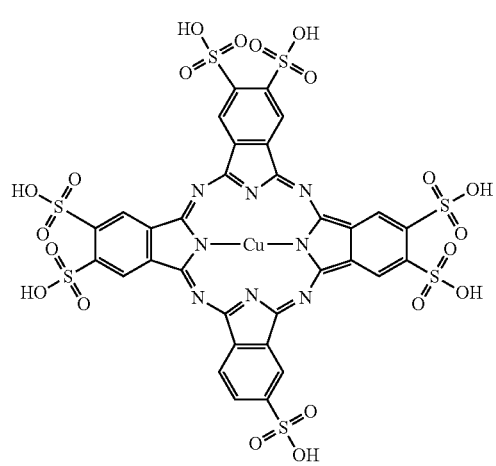 (114)

and

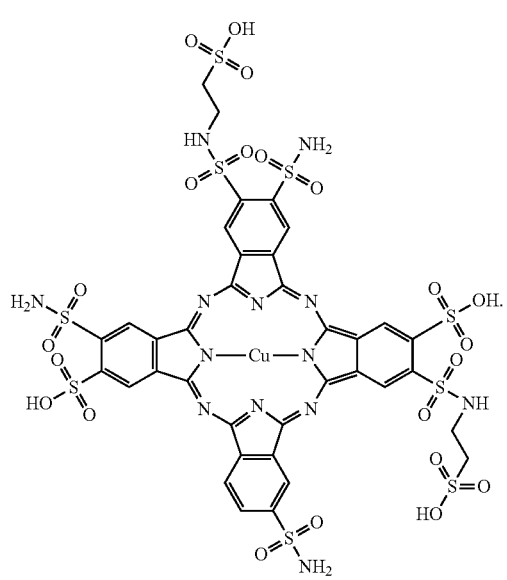 (115)

[In formulae (100) to (115) above, the lines denote alkyl chains. Accordingly, for example, the representation

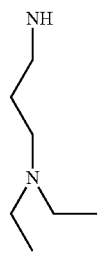

corresponds to the radical NHCH$_2$CH$_2$CH$_2$N(CH$_2$CH$_3$)$_2$].

The dyes of formula (1) according to the invention may be used for dyeing or printing paper, wood or semi-synthetic or, especially, synthetic hydrophobic fibre materials such as, for example, textile materials. Textile materials composed of blend fabrics that comprise such semi-synthetic or synthetic hydrophobic textile materials may also be dyed or printed using the dyes according to the invention.

For printing, the customary thickeners will be used, for example modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes according to the invention impart to the said materials level colour shades having very good in-use fastness properties, especially excellent resistance to ozone and to nitrogen oxides and also good fastness to light. In addition, the higher-sulfonamidated, especially heptasulfonamidated, phthalocyanine-metal complex dyes have an interesting and sought-after green-tinged cyan shade.

The dyes of formula (1) according to the invention may also be used in admixture with other dyes, especially with one or more dyes of formula (1) wherein n and m are each independently of the other a number from 0 to 4 and the sum of (m+n) is from 1 to 4. Such mixtures contain preferably from 5 to 99% by weight, especially from 10 to 99% by weight and more especially from 20 to 99% by weight, of the dyes of formula (1) according to the invention.

In an especially preferred embodiment, the present invention relates to inks which comprise at least one dye of formula (1).

The inks according to the invention may comprise further dyes, in addition to the above-mentioned dyes, for the purpose of shade modification.

The inks contain preferably from 1 to 35% by weight, especially from 1 to 30% by weight and more especially from 1 to 20% by weight, of at least one dye of formula (1), based on the total weight of the ink.

Preference is given to such inks that have a viscosity of from 1 to 40 mPa·s (millipascal seconds).

The inks usually comprise water-miscible organic solvents in an amount of from 1 to 40% by weight, for example $C_1$-$C_4$alcohols, for example methanol, ethanol, n-propanol, isopropanol, n-butanol, sec-butanol, tert-butanol and isobutanol; amides, for example dimethylformamide and dimethylacetamide; ketones or ketone alcohols, for example acetone and diacetone alcohol; ethers, for example tetrahydrofuran and dioxane; nitrogen-containing heterocyclic compounds, for example N-methyl-2-pyrrolidone and 1,3-dimethyl-2-imidazolidone; polyalkylene glycols, for example polyethylene glycol and polypropylene glycol; $C_2$-$C_6$-alkylene glycols and thioglycols, for example ethylene glycol, propylene glycol, butylene glycol, triethylene glycol, thiodiglycol, hexylene glycol and diethylene glycol; further polyols, for example glycerol and 1,2,6-hexanetriol; and $C_1$-$C_4$alkyl ethers of polyhydric alcohols, for example 2-methoxyethanol, 2-(2-methoxyethoxy)ethanol, 2-(2-ethoxyethoxy)ethanol, 2-[2-(2-methoxyethoxy)ethoxy]ethanol and 2-[2-(2-ethoxyethoxy)ethoxy]ethanol; preferably N-methyl-2-pyrrolidone, diethylene glycol, glycerol or especially 1,2-propylene glycol, preferably in an amount of from 2 to 30% by weight, especially from 5 to 30% by weight and more especially from 10 to 25% by weight, based on the total weight of the ink.

The inks may also comprise solubilisers, for example ε-caprolactam.

The inks may comprise thickeners of natural or synthetic origin inter alia for the purpose of adjusting the viscosity.

Examples of thickeners that may be mentioned include commercially available alginate thickeners, starch ethers or locust bean flour ethers, especially sodium alginate on its own or in admixture with modified cellulose, for example methylcellulose, ethylcellulose, carboxymethyl cellulose, hydroxyethyl cellulose, methyl hydroxyethyl cellulose, hydroxypropyl cellulose or hydroxypropyl methylcellulose, especially with preferably from 20 to 25% by weight carboxymethyl cellulose. Synthetic thickeners that may be mentioned are, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, for example borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 10, especially from 5 to 8.

As further additives, the inks may comprise surfactants or humectants.

Suitable surfactants include commercially available anionic or non-ionic surfactants. As humectants in the inks according to the invention there come into consideration, for example, urea, glycerol, propylene glycol, or a mixture of sodium lactate (advantageously in the form of a 50% to 60% aqueous solution) and glycerol and/or propylene glycol in amounts of preferably from 0.1 to 30% by weight, especially from 2 to 30% by weight.

If desired, the inks may additionally comprise acid donors such as butyrolactone or sodium hydrogen phosphate, preservatives, fungal- and/or bacterial-growth-inhibiting substances, antifoam agents, sequestering agents, emulsifiers, water-insoluble solvents, oxidising agents or deaerating agents.

Suitable preservatives are especially formaldehyde-yielding agents, for example paraformaldehyde and trioxane, especially aqueous, approximately from 30 to 40% by weight formaldehyde solutions; suitable sequestering agents are, for example, sodium nitrilotriacetate, sodium ethylenediaminetetraacetate, especially sodium polymetaphosphate, more especially sodium hexametaphosphate; suitable emulsifiers are especially adducts of an alkylene oxide and a fatty alcohol, especially an adduct of oleyl alcohol and ethylene oxide; suitable water-insoluble solvents are high boiling, saturated hydrocarbons, especially paraffins having a boiling range of approximately from 160 to 210° C. (so-called white spirit); a suitable oxidising agent is, for example, an aromatic nitro compound, especially an aromatic mono- or di-nitro-carboxylic or -sulfonic acid which may be in the form of an alkylene oxide adduct, especially a nitrobenzenesulfonic acid; and suitable deaerating agents are, for example, high boiling solvents, especially turpentine oils, higher alcohols, preferably $C_8$-$C_{10}$alcohols, terpene alcohols or deaerating agents based on mineral oils and/or silicone oils, especially commercial formulations composed of approximately from 15 to 25% by weight of a mineral oil and silicone oil mixture and approximately from 75 to 85% by weight of a $C_8$ alcohol, such as, for example, 2-ethyl-n-hexanol. These are usually used in amounts of from 0.01 to 5% by weight, based on the total weight of the ink.

The inks can be prepared in customary manner by mixing together the individual constituents in the desired amount of water. Where necessary, the inks are clarified by filtration through a very fine filter.

The inks according to the invention are, for example, suitable for printing. Examples of appropriate printing methods that may be mentioned are conventional printing, stencil printing and inkjet printing methods.

The inks according to the invention are especially suitable for use in recording systems of a kind wherein an ink is expressed from a small opening in the form of droplets that are directed towards a substrate on which an image is produced. Suitable substrates are, for example, textile fibre materials, paper, or plastics films. Suitable recording systems are, for example, commercially available inkjet printers for use in paper printing or textile printing, or writing instruments, such as fountain pens or ballpoint pens and especially inkjet printers.

In inkjet printing, individual droplets of the ink are sprayed onto a substrate in a controlled manner from a nozzle. For that purpose, predominantly the continuous inkjet method and the drop-on-demand method are used. In the continuous inkjet method, the droplets are produced continuously and any droplets not required for the printing are conveyed to a collecting vessel and recycled, whereas in the drop-on-demand method droplets are produced and printed as required, that is to say droplets are produced only when required for the printing. The production of the droplets can be effected, for example, by means of a piezo-inkjet head or by means of thermal energy (bubble jet). Printing by means of a piezo-inkjet head is preferred for the method according to the invention. Printing by the continuous inkjet method is furthermore preferred for the method according to the invention.

Depending on the nature of its use, it may be necessary for e.g. the viscosity or other physical properties of the ink, especially those properties affecting the affinity for the substrate in question, to be modified as appropriate.

As textile fibre materials there come into consideration, especially, nitrogen-containing or hydroxy-group-containing fibre materials, for example textile fibre materials of cellulose, silk, wool or synthetic polyamides.

The inks according to the invention, which comprise the dyes of formula (1), are especially suitable for recording on paper and very especially suitable for use in paper printing.

As examples of paper that can be printed with the inks according to the invention there may be mentioned commercially available inkjet paper, photo paper, glossy paper, plastics-coated paper, for example Canon Photo Paper, Epson Inkjet Paper, Epson Photo Paper, Epson Glossy Film, HP Special lnkjet Paper, Encad Photo Gloss Paper, Ilford Photo Paper and, especially, microporous photo paper, for example Ilford Printasia Photo Glossy Paper, Canon Photo Paper Pro PR-101 and Epsom Premium Glossy Photo Paper.

Plastics films that can be printed with the inks according to the invention are, for example, transparent or cloudy/opaque. Suitable plastics films are, for example, 3M transparency film.

The present invention accordingly relates also to a method of printing paper, plastics films or textile fibre materials, especially by the inkjet printing method, wherein an aqueous ink is used which comprises
from 1 to 35% by weight of at least one dye of formula (1) and
from 1 to 40% by weight of a water-miscible organic solvent, based on the total weight of the ink.

The inks according to the invention are storage-stable and exhibit no precipitation on storage for relatively long periods.

The prints produced in accordance with the invention are distinguished by good fastness to light and by excellent resistance to gases, especially ozone.

The following Examples serve to illustrate the invention. Unless otherwise indicated, the temperatures are given in degrees Celsius, parts (where given) are parts by weight and percentages relate to % by weight. Parts by weight relate to parts by volume in a ratio of kilograms to litres.

EXAMPLE 1a

Cu-Phthalocyanine Heptasulfonic Acid 57.6 g of copper phthalocyanine are introduced into 200 ml of sulfuric acid monohydrate.

After addition of 90 ml of oleum (66%) over 30 minutes, the reaction mixture is maintained at 150° C. for 160 hours.

After cooling to 60° C., the reaction solution is further processed in accordance with Example 1b.

EXAMPLE 1b

Cu-Phthalocyanine Heptasulfochloride

To the reaction solution of Example 1a, cooled to 60° C., there are added, dropwise, 425 ml of thionyl chloride. After 16 hours at 75° C., the reaction mixture is cooled to room temperature and poured into ice-water. The product precipitates out completely, is filtered off and is washed with ice-water. After gentle drying in vacuo, 30 g of product comprising Cu-phthalocyanine heptasulfochloride are obtained.

EXAMPLE 1c

Cu-Pc Heptasulfonamide/Sulfonic Acid 26.5 g of Cu-Pc heptasulfochloride according to Example 1b are introduced into dilute aqueous ammonia solution (pH=8), the pH being held constant at 8 by adding appropriate amounts of ammonia (12.5%). After stirring for 20 hours at room temperature, heating at 40° C. is carried out for a further 5 hours, whilst continuing to maintain the pH at 8. The reaction solution is then concentrated to 400 ml using a rotary evaporator, dialysed and then evaporated to dryness. 12.3 g of a green-tinged cyan dye comprising Cu-Pc heptasulfonamide/sulfonic acid are obtained.

EXAMPLE 1d

Cu-Phthalocyanine Heptasulfonic Acid 57.6 g of copper phthalocyanine are introduced into 200 ml of sulfuric acid monohydrate.

After addition of 90 ml of oleum (66%) over 30 minutes, the reaction mixture is maintained at 160° C. for 24 hours.

After cooling to 60° C., the reaction solution is further processed in accordance with Example 1b.

EXAMPLE 2

Cu-Pc Heptasulfotauride/Sulfonic Acid 172.5 g of taurine are dissolved in water at pH 10. To the resulting solution there are added, at 0° C., with stirring, 28.75 g of product according to Example 1b. After stirring for one hour whilst the pH is held constant at 10 using 4N sodium hydroxide solution, the temperature is increased to 40° C. After stirring for one hour at that temperature and at a constant pH of 10, the pH is lowered to 8 and the reaction solution is concentrated to 500 ml. After filtration, the solution is dialysed and then evaporated to dryness. 14.7 g of a green-tinged cyan dye are obtained.

By using the equivalent amount of the amines given in Table 1 instead of taurine in Example 2, corresponding dyes of formula (1) are likewise obtained:

TABLE 1

| Amine | Amine |
|---|---|
| $NH(CH_3)(CH_2)_2SO_3H$ | $NH_2(CH_2)_2OH$ |
| $NH_2(CH_2)_3OH$ | $NH_2(CH_2)_2OSO_3H$ |

TABLE 1-continued

| Amine | Amine |
|---|---|
| NH(CH$_2$CH$_2$OH)$_2$ | NH(CH$_2$CH$_2$OSO$_3$H)$_2$ |
| NH$_2$(CH$_2$)$_2$O(CH$_2$)$_2$OH | NH$_2$(CH$_2$)$_5$OH |
| NH$_2$CH$_2$CH(CH$_3$)OH | NH$_2$(CH$_2$)$_2$NH(CH$_2$)$_2$OH |
| NH$_2$(CH$_2$)$_2$N(CH$_2$CH$_3$)$_2$ | NH$_2$(CH$_2$)$_3$N(CH$_2$CH$_3$)$_2$ |
| NH$_2$(CH$_2$)$_2$NH(CH$_2$)$_3$NH$_2$ | NH$_2$(CH$_2$)$_2$NH(CH$_2$)$_2$NH$_2$ |
| NH$_2$(CH$_2$)$_3$NH(CH$_2$)$_3$NH$_2$ | NH$_2$CH$_2$C(CH$_3$)$_2$CH$_2$NH$_2$ |
| NH$_2$(CH$_2$)$_3$NHCH$_2$CH$_3$ | NH$_2$(CH$_2$)$_3$N(CH$_3$)$_2$ |
| NH$_2$(CH$_2$)$_3$N(CH$_2$CH$_3$)$_2$ | NH$_2$(CH$_2$)$_3$NH(CH$_2$)$_3$N(CH$_3$)$_2$ |
| NH$_2$(CH$_2$)$_3$NH(CH$_2$)$_3$OH | NH$_2$CH$_2$CH(OH)CH$_2$NH$_2$ |
| NHCH$_2$CH$_2$OH<br>\|<br>CH$_2$CH$_2$CH$_2$OH | NH$_2$(CH$_2$)$_3$N(CH$_2$)$_3$NH$_2$<br>\|<br>CH$_3$ |
| NH$_2$(CH$_2$)$_2$—N⟨O⟩ (morpholine) | NH$_2$(CH$_2$)$_2$—N⟨NH⟩ (piperazine) |
| HN(CH$_2$)$_2$OH / (CH$_2$)$_3$CH$_3$ | HN(CH$_2$)$_3$N(CH$_3$)$_2$ / (CH$_2$)$_3$N(CH$_3$)$_2$ |
| aminocyclohexane structure (H$_3$C, H$_3$C, CH$_3$, CH$_2$NH$_2$, NH$_2$) | H$_2$N—CH(COOH)—C$_6$H$_5$ |
| NH$_2$OH | NH$_2$(CH$_2$)$_2$COOH |
| NH$_2$CH$_2$COOH | morpholine |
| aniline-4-sulfonic acid | aniline-3-sulfonic acid |
| aniline-2-sulfonic acid | NH$_2$(CH$_2$)$_2$S(CH$_2$)$_2$OH |
| NH$_2$(C$_6$H$_4$)SO$_2$CH$_2$CH$_2$OSO$_3$H | piperazine |
| NH$_2$(CH$_2$)$_2$—piperidine | H$_2$N—CH(COOH)—CH$_2$CH$_2$CONH$_2$ |
| NH(CH$_3$)CH$_2$COOH | NH$_2$(CH$_2$)$_5$COOH |
| NH$_2$CH$_2$SO$_3$H | H$_2$N—CH(COOH)—CH$_2$CH$_2$COOH |
| H$_2$N—CH(COOH)—CH$_2$COOH | H$_2$N—CH(COOH)—CH$_2$SH |

EXAMPLE 3

Preparation of Printing Inks and Inkjet Printing 6.6 g of dye according to Example 1c are dissolved in 85 g of water. After adding 5 g of diethylene glycol, the resulting ink is introduced into an inkjet printing cartridge. Prints made using that cyan ink on photo paper (for example, Canon Photo Paper Pro PR-101, Epson Premium Glossy Photo Paper, Ilford Photo Paper or Ilford Printasia Photo Glossy Paper) have excellent resistance to ozone and to light.

EXAMPLE 4

Preparation of Printing Inks and Inkjet Printing

By proceeding as described in Example 3 but using 7.2 g of the dye according to Example 2, inkjet prints on photo paper (analogous to Example 3) having excellent resistance to ozone and to light are likewise obtained.

What is claimed is:

1. A dye having the formula

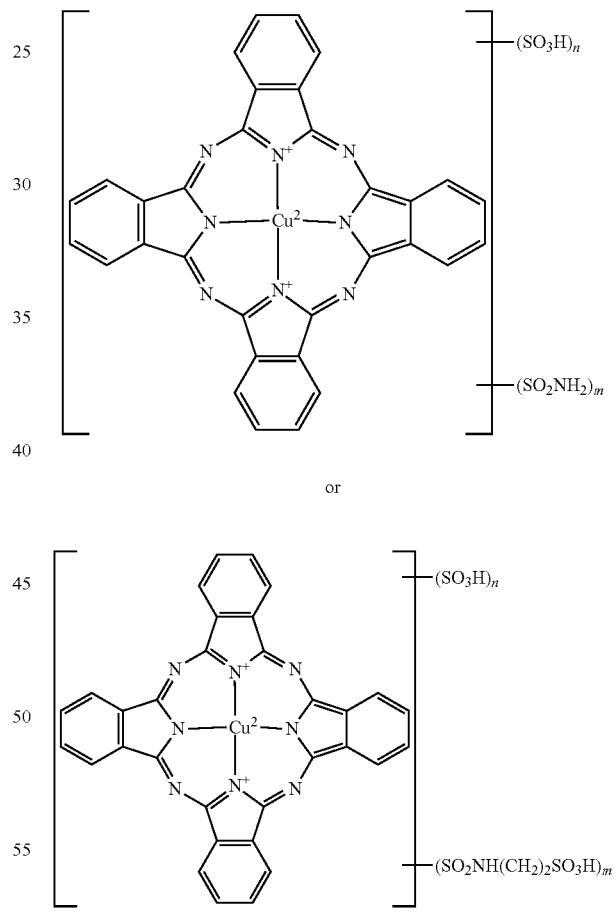

or

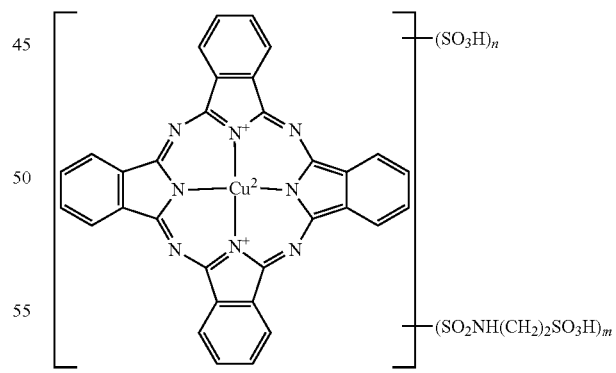

wherein

R$_1$ is hydrogen;

R$_2$ is hydrogen, unsubstituted C$_{1-12}$ alkyl or C$_{1-12}$ alkyl substituted by SO$_3$H; and n and m are each independently 0, 1, 2, 3, 4, 5, 6 or 7, the sum of (n+m) being 7.

2. A process for preparing a dye according to claim 1, said process comprising:
sulfonating a compound of formula

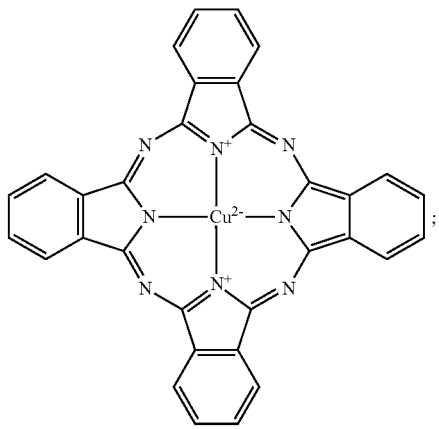

using a strong sulfonating agent;
optionally neutralising the resulting sulfonic acid using a compound containing H⁺; and
optionally converting the sulfonic acid, or its salt into a sulfochloride and reacting the sulfochloride with ammonia or an amine.

3. A dye mixture comprising at least one dye (1) according to claim 1 and at least one other dye.

4. The dye mixture of claim 3, wherein the at least one other dye is a dye of formula (I)

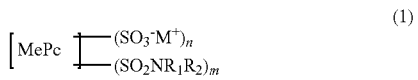 (1)

at least one dye of formula (1) wherein n and m are each independently number from 0 to 4 such that the sum of (m+n) is from 1 to 4
wherein
Pc is a phthalocyanine of formula

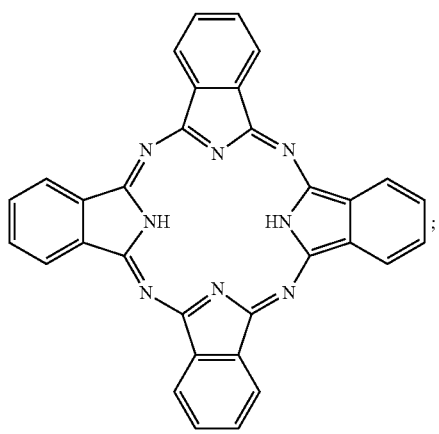

Me is a metal;
[MePc] is a phthalocyanine-metal complex of formula

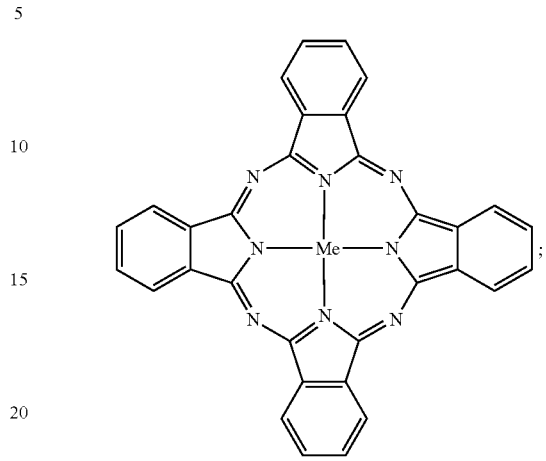

$M^+$ is an inorganic or organic cation;
$R_1$ is hydrogen; and
$R_2$ is hydrogen, unsubstituted $C_{1-12}$ alkyl, or $C_{1-12}$ alkyl substituted by $SO_3H$.

5. The dye mixture according to claim 3, said mixture comprising from 5 to 99% by weight of the at least one dye according to claim 1.

6. A method of dyeing or printing natural, semi-synthetic, or synthetic material, said method comprising applying one or more dyes according to claim 1 to said natural, semi-synthetic, or synthetic material.

7. An ink containing from 1 to 35% by weight of at least one dye of formula (1) according to claim 1.

8. A method of printing a natural, semi-synthetic, or synthetic material using an inkjet printing method, said method of printing comprising applying in which method an ink according to claim 7 to said natural, semi-synthetic, or synthetic material.

9. The method according to claim 8, wherein natural, semi-synthetic, or synthetic material is paper, a plastics film, or a textile fiber material.

10. The method according to claim 9, wherein paper is a microporous photo paper.

11. A natural, semi-synthetic, or synthetic material dyed with or printed onto with a dye according to claim 1.

12. The process according to claim 2, wherein the strong sulfonating agent is chlorosulfonic acid or oleum/sulfuric acid monohydrate.

13. The dye mixture according to claim 5, said mixture comprising from 10 to 99% by weight of the at least one dye according to claim 1.

14. The method of dyeing or printing natural, semi-synthetic, or synthetic material according to claim 6, wherein the natural, semi-synthetic, or synthetic material is a textile material.

15. The method according to claim 9, wherein the paper is photo paper.
16. A dye of formula
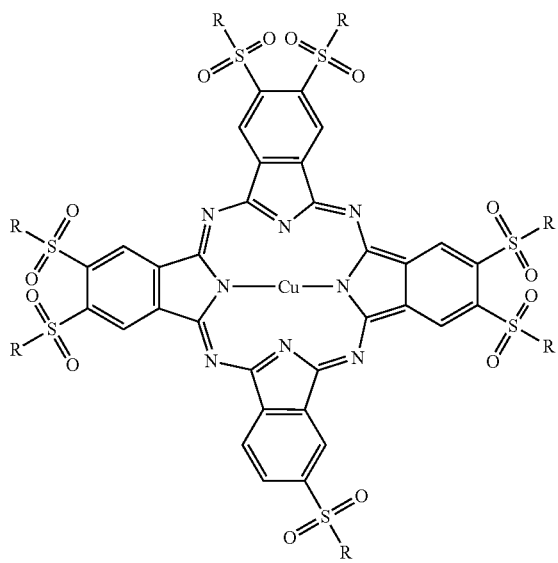
wherein R is OH or NH$_2$,
or a dye of formula
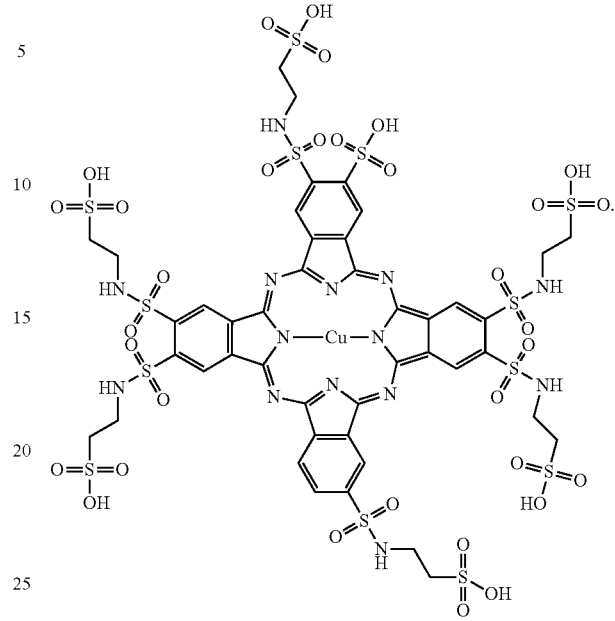
17. The method of claim 2, wherein converting the sulfonic acid, or its salt, into a sulfochloride comprises reacting the sulfonic acid, or its salt, with thionyl chloride or phosphorus oxychloride.
* * * * *

UNITED STATES PATENT AND TRADEMARK OFFICE
CERTIFICATE OF CORRECTION

PATENT NO. : 7,942,938 B2
APPLICATION NO. : 11/922661
DATED : May 17, 2011
INVENTOR(S) : Urs Lehmann It is certified that error appears in the above-identified patent and that said Letters Patent is hereby corrected as shown below:

In the Claims:

Col. 24, Claim 1 - delete lines 62-64 which read as follows:

"R1 is hydrogen;
R2 is hydrogen, unsubstituted C1-12 alkyl or C1-12 alkyl substituted by SO3H; and"

Signed and Sealed this
Sixth Day of November, 2012

David J. Kappos
*Director of the United States Patent and Trademark Office*